United States Patent
Verburg et al.

(10) Patent No.: US 7,140,324 B2
(45) Date of Patent: Nov. 28, 2006

(54) METHOD OF COOLING ANIMALS

(75) Inventors: Carlo Verburg, Pijnacker (NL); Alexander van der Lely, Rotterdam (NL); Reantus Ignatius Josephus Fransen, Vlaardingen (NL); Karel van den Berg, Bleskensgraaf (NL)

(73) Assignee: Lely Research Holding A.G., Zug (CH)

( * ) Notice: Subject to any disclaimer, the term of this patent is extended or adjusted under 35 U.S.C. 154(b) by 350 days.

(21) Appl. No.: 09/832,119

(22) Filed: Apr. 11, 2001

(65) Prior Publication Data

US 2002/0124810 A1    Sep. 12, 2002

Related U.S. Application Data

(63) Continuation of application No. PCT/NL00/00504, filed on Jul. 18, 2000.

(30) Foreign Application Priority Data

Aug. 11, 1999    (NL)    .................................... 1012809

(51) Int. Cl.
 *A01K 1/00*    (2006.01)
 *A01J 3/00*    (2006.01)
(52) U.S. Cl. ..................................... 119/516; 119/14.03
(58) Field of Classification Search ............ None
 See application file for complete search history.

(56) References Cited

U.S. PATENT DOCUMENTS

| | | | |
|---|---|---|---|
| 3,807,088 A * | 4/1974 | Jones ........................ 47/62 N |
| 3,994,292 A * | 11/1976 | Goodwin ............... 128/200.14 |
| 4,345,548 A | 8/1982 | Krebs et al. ................. 119/108 |
| 4,693,852 A | 9/1987 | Gordon ........................ 261/30 |
| 4,773,471 A * | 9/1988 | Grant et al. ................... 165/60 |
| 5,285,651 A * | 2/1994 | Marine ......................... 62/171 |
| 5,678,506 A * | 10/1997 | van der Berg et al. ... 119/14.18 |
| 5,803,015 A * | 9/1998 | Rhodes et al. ........... 119/14.02 |
| 5,816,190 A | 10/1998 | Van der Lely ........... 119/14.08 |
| 5,970,911 A * | 10/1999 | van der Lely ........... 119/14.02 |
| RE36,391 E * | 11/1999 | van den Berg et al. ... 119/14.08 |
| 5,984,875 A * | 11/1999 | Brune ......................... 119/174 |
| 6,079,360 A | 6/2000 | Birk ......................... 119/14.09 |
| 6,099,482 A * | 8/2000 | Brune et al. ................. 119/174 |
| 6,152,382 A * | 11/2000 | Pun ............................. 239/77 |
| 6,182,463 B1 * | 2/2001 | Strussion et al. ............. 62/314 |
| 6,418,728 B1 * | 7/2002 | Monroe ........................ 62/3.2 |
| 6,438,977 B1 * | 8/2002 | McKay ........................ 62/171 |

FOREIGN PATENT DOCUMENTS

| | | |
|---|---|---|
| BE | 439919 A | 11/1940 |
| DE | 314419 | 9/1918 |
| DE | 1926019 | 10/1965 |
| EP | 0728413 A1 | 8/1996 |
| GB | 2313032 A | 11/1997 |

(Continued)

*Primary Examiner*—Thomas Price
(74) *Attorney, Agent, or Firm*—Penrose Lucas Albright

(57) ABSTRACT

An apparatus for cooling an animal in a place such as a milking stall or feeding stall wherein an artificial climate is created. The artificial climate disclosed comprises wetting the animal with a water vapor and causing an air flow over the wetted area of the animal. Water vapor is sprayed and rubbed onto the back of the animal while shields protect areas to remain dry. During the process the animal is monitored for signs of thermal stress using a variety of methods and the wetting and cooling process are discontinued if the artificial climate adversely affects the animal.

5 Claims, 1 Drawing Sheet

FOREIGN PATENT DOCUMENTS

WO PCT/NL97/00278 11/1997

WO PCT/SE97/01161 2/1998

\* cited by examiner

METHOD OF COOLING ANIMALS

RELATED APPLICATION

This Application is a continuation of International Application No. PCT/NL00/00504, filed Jul. 18, 2000.

FIELD OF THE INVENTION

The invention relates to a method of cooling animals in a stable.

BACKGROUND OF THE INVENTION

In a known method, for example, water droplets are dispersed through the stable by means of air ventilation for the purpose of cooling the animals.

This method has the disadvantage of water being distributed throughout the stable, so that an excess of water is required. A further disadvantage of the known method is that air flow means is the only method used for transporting the water droplets.

SUMMARY OF THE INVENTION

In view of the foregoing, the invention aims at a method in which the above-mentioned drawbacks are obviated or at least minimized. In accordance with the invention, this is achieved by liquid application between the hairs or on the skin, or by a combination of both, of the animal, whereupon air is blown over the liquid. In this manner the evaporation of the liquid is optimally utilized, so that an optimal cooling of the animal is obtained. According to a further inventive feature, an even better cooling is obtained if the liquid is atomized to a fine spray. According to another inventive feature, the liquid is rubbed between the hairs or on the skin, or a combination of both, of the animal. According to another inventive feature, the liquid is applied between the hairs or on the skin, or both, of the animal by rubbing or brushing, or a combination of both. In order to avoid the use of too much liquid, according to an inventive feature, a previously determined maximum amount of liquid per animal is applied to the animal.

Upon wetting the animal, it is important to avoid the formation of unevenly large droplets, because large droplets evaporate less readily. Furthermore, formation of droplets may result in the liquid reaching restricted places where wetting is not desired, such as, for example, the teats of an animal to be milked. Therefore, according to an inventive feature, during wetting, the animal is checked to determine whether droplets are formed on the animal's skin or falling from the animal. According to an inventive feature, wetting of the animal is stopped if formations of droplets are ascertained during wetting. Formation of droplets can be recorded, for example, by optical means such as picture recognition. According to another inventive feature, the back of the animal is cooled. In order to avoid wetting certain restricted parts of the animal unintentionally with liquid, according to an inventive feature, during wetting or cooling, or both, the animal's undesired parts are shielded. It is desirable, for example, to shield the head and the udder or the teats, or both, of the animal. Therefore, the invention teaches a method of protecting certain parts of an animal, such as a cow, during treating the animal, such as cooling the animal, whereby at least during part of the treatment certain parts of the body to be protected are shielded against the relevant treatment with the aid of a shielding means. According to a further inventive feature, the udder or the teats of the animal or the animal's head, or both, are shielded.

For the purpose of monitoring the cooling process of the animal, according to an inventive feature, the animal's temperature, in particular the temperature of the skin or the body or the ambient temperature in the vicinity of the part of the animal to be cooled or two more temperatures, is determined. According to another inventive feature, cooling is stopped when a predetermined temperature is reached. In order to avoid exposing the animal to stress during cooling, according to an inventive feature, the animal's behavior is observed during cooling, and cooling is stopped if the animal's behavior changes. According to another aspect of the invention, the animal's behavior can be deduced from deviations from a determined set number of movements of the animal per unit of time. In practice it has been found that animals experience cooling as a pleasant sensation during or prior to milking, or both. According to the invention, it has further been found that the animals go to the milking stall spontaneously if they are cooled there.

The invention also relates to a method in which stress, for example, heat stress, of the animals to be cooled is ascertained, whereupon it is decided whether or not to cool the animal as described using the foregoing method. The invention also relates to a method in which heat stress is ascertained on the basis of an infrared picture of the animal. The invention also teaches a method where the period of time during which the animal is cooled or the intensity of cooling, or both, depend on a heat stress factor which is determined from an infrared picture.

The invention further teaches a method in which stress, for example, heat stress, of the animal is ascertained on the basis of the position of the animal's ears. According to another method, stress, such as heat stress, of the animal is ascertained by determining the wetness of the animal's coat. According to a further aspect of the method, stress, such as heat stress, of the animal is ascertained by determining the activity of the animal. According to another feature of the method, stress, such as heat stress, of the animal is ascertained by determining the expression of the animal's eyes. According to again another aspect of the method, stress, such as heat stress, of the animal is ascertained by determining the animal's breath or breathing, or both. According to another aspect of the method, stress, such as heat stress, of the animal is ascertained by determining the tension of its muscles, in particular, the back muscles, of the animal. According to again another aspect of the method, stress, such as heat stress, of the animal is ascertained by determining if the animal is walking with its tongue out.

The invention also relates to a device for applying the methods as described above, whereby the device is provided with wetting means with the aid of which a liquid is reduced to a fine spray for application to at least part of the animal, in particular between the hairs or on the skin, or both, of that part of the animal. An air flow is directed over the wetted part with the aid of air displacing means. According to a further inventive feature, the wetting means comprises a liquid atomization device. By means of the liquid atomization device it is possible to apply, for example, a fine spray of water to the animal. The wetting means may further comprise a brushing device. According to another inventive feature, the air displacing means comprises a controlling means with the aid of which the amount of air to be displaced or the velocity of the air to be displaced, or both, is set. The aforementioned cooling methods and means combined with temperature measurements make it possible to control cooling of the animal very accurately. According to a further inventive feature, the device is arranged in a milking compartment or a foremilking compartment or a cleaning compartment or in a post-treatment compartment for milking or for cleaning certain parts, such as the teats, of the animal. According to again another inventive feature, there is disposed a milking robot in the milking compartment, by means of which teat cups are automatically connected to the teats of the animal to be milked.

In accordance with a further aspect of the invention, the device comprises means for determining stress, in particular heat stress, of an animal. According to another inventive feature, the stress determining means comprises a camera, such as, for example, an infrared camera. According to again another inventive feature, the stress means comprises a hydrometer. According to a further inventive feature, the stress determining means comprises an odor meter.

BRIEF DESCRIPTION OF THE DRAWINGS

The invention will now be explained in further detail with reference to the accompanying drawings, in which.

DETAILED DESCRIPTION OF THE PREFERRED EMBODIMENTS

Figure 1:
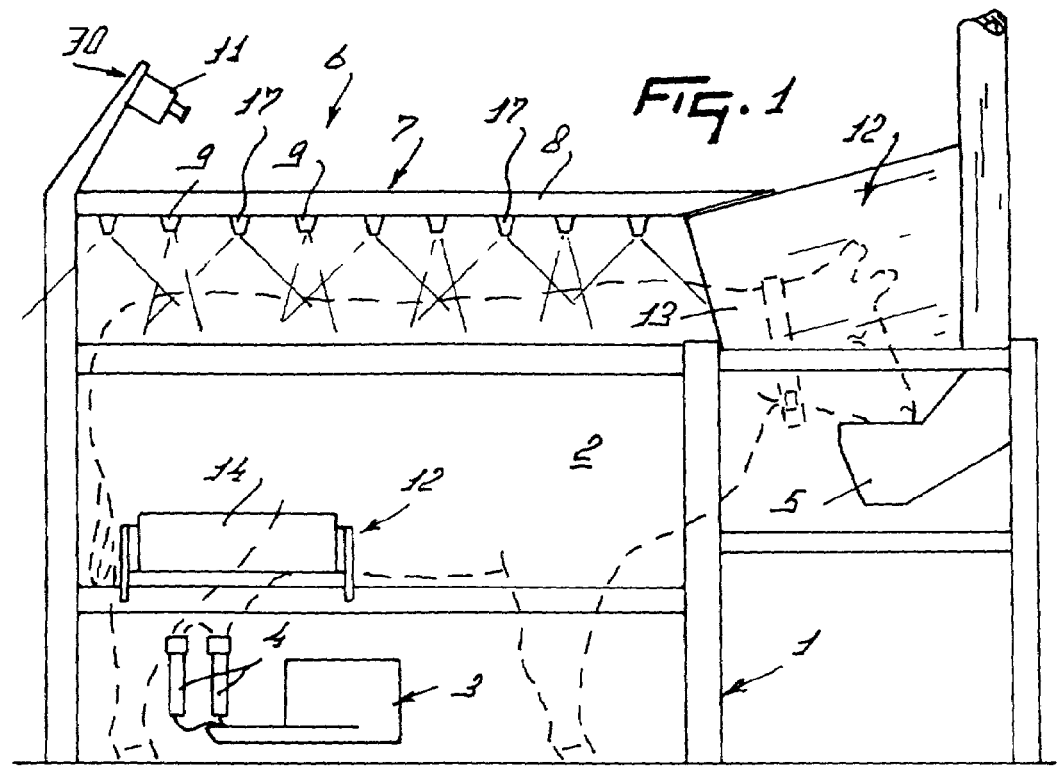
FIG. 1 is a schematic side elevational view of a first embodiment of the invention.

FIG. 1 is a side view of a milking compartment 1 with a cow 2 present therein. Milking compartment 1 comprises a milking robot 3 with teat cups 4 which are connected automatically to the teats of cow 2 by means of the milking robot 3. Near the front side of the milking compartment 1 there is further disposed a feeding trough 5 to which feed can be supplied in metered portions. Milking compartment 1 is further provided with regulating means 6 with the aid of which at least one previously determined climate parameter is set artificially in milking compartment 1. Regulating means 6 comprise wetting means 7 with the aid of which at least the back of cow 2 is wetted. Wetting means 7 comprises a sprayer beam 8 with nozzles 9, by means of which a liquid can be atomized to a fine spray. The liquid is reduced to a fine spray and is applied to the back of cow 2. Air is directed over the wetted surface by means of sprayer beam 8 and nozzles 9. In this manner the back of cow 2 is cooled. During wetting cow 2 is monitored with the aid of a detection means 10 to determine whether or not formation of droplets takes place. Detection means 10 comprises a camera 11. In order to prevent certain parts of cow 2 from coming into contact with the liquid, milking compartment 1 is further provided with shielding means 12. In the present embodiment the shielding means 12 comprises a transparent shielding cap 13 which covers the head of the cow 2 during wetting. Shielding means 12 further comprises a second shielding cap 14 by means of which the udder of cow 2 can be shielded. The second shielding cap 14 is fitted with a pivoting means to the milk box 1.

Figure 2:
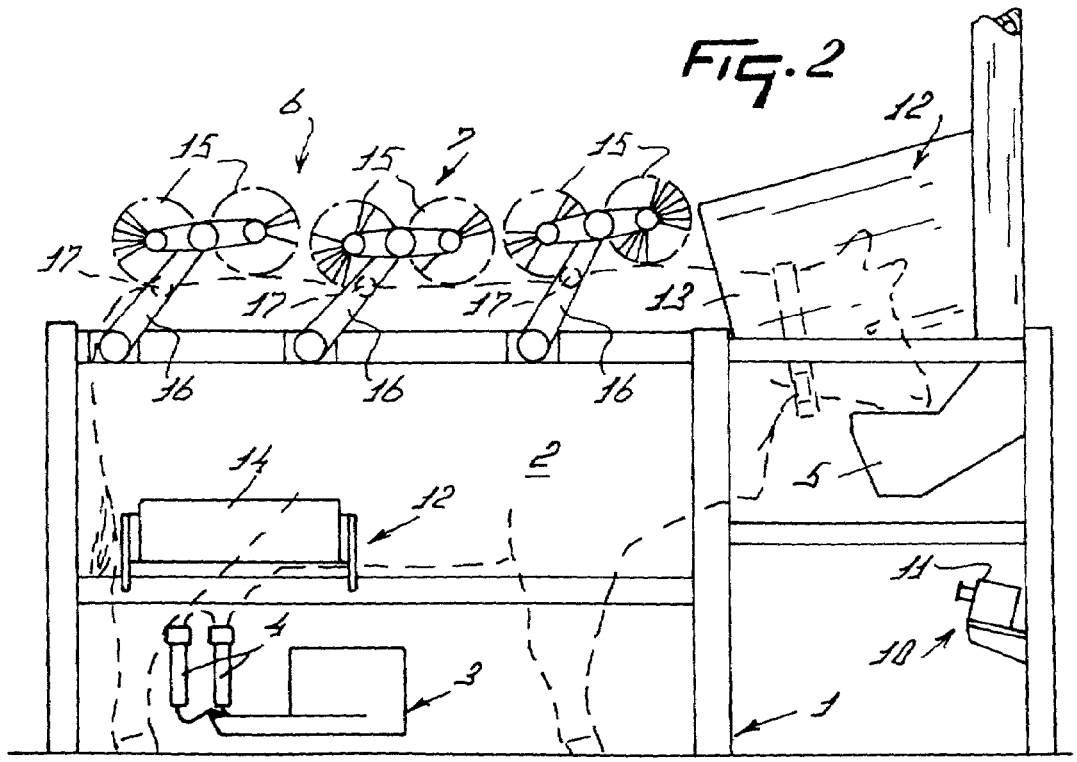
FIG. 2 is a view similar to FIG. 1 which shows a second embodiment of a device according to the invention.

FIG. 2 shows a second embodiment of the invention, in which parts corresponding to those of the first embodiment are indicated by the same reference numerals. In the second embodiment of the invention, wetting means 7 comprises motor-driven brushes 15 which are provided with liquid supply means so liquid can be supplied to brushes 15 during brushing. Thus, the liquid is rubbed in the hair of cow 2 by means of brushes 15. Motor-driven brushes 15 are disposed on a pivoting arm 16 which is connected to milking compartment 1. Pivoting arm 16 comprises an air displacing means 17 for directing air over the wetted surface of cow 2 after or during brushing.

Although we have disclosed the preferred embodiments of our invention, it is to be understood that it is capable of other adaptations within the scope of the following claims:

The invention claimed is:

1. A milking compartment for confining and milking an animal therein which comprises:
    a milking robot for automated milking of said animal in said compartment;
    a feeding trough for feeding said animal while it is being milked; and
    cooling means for cooling said animal while it is in said milking compartment, said cooling means being disposed over said animal, said cooling means comprising a plurality of nozzles that provide a fine spray of atomized water which produces a wetted area substantially on the back only of said animal while in said compartment, and an air displacing means that provides a cooling air flow on said wetted area.

2. A milking compartment in accordance with claim 1, wherein said wetted area comprises water which is between hairs of said animal and there are substantially no unevenly long droplets on said wetted area.

3. A milking compartment in accordance with claim 1, wherein said air displacing means comprises air flow controlling means that controls the velocity of the air which is displaced by said air displacing means.

4. A milking compartment in accordance with claim 1, comprising means for determining whether said animal is undergoing thermal stress.

5. A milking compartment in accordance with claim 4, wherein said means for determining thermal stress comprises a camera.

* * * * *